United States Patent [19]

Blair

[11] Patent Number: 5,512,176

[45] Date of Patent: Apr. 30, 1996

[54] DESALINATION PROCESS

[75] Inventor: E. Allan Blair, Pennington, N.J.

[73] Assignee: Saudi Basic Industries Corporation, Riyadh, Saudi Arabia

[21] Appl. No.: 262,949

[22] Filed: Jun. 21, 1994

Related U.S. Application Data

[62] Division of Ser. No. 96,766, Jul. 23, 1993, Pat. No. 5,354,835.

[51] Int. Cl.$^6$ .............................. C02F 1/58; B01D 39/16; B01D 71/54

[52] U.S. Cl. ................. 210/633; 210/500.27; 210/510.1; 210/642; 210/902; 210/924; 524/909; 528/59; 528/60; 528/66; 528/76; 528/77; 528/904

[58] Field of Search ........................... 210/500.27, 510.1, 210/642, 633, 902, 924; 524/909; 528/59, 60, 66, 76, 77, 904

[56] References Cited

U.S. PATENT DOCUMENTS

| | | | |
|---|---|---|---|
| 3,438,893 | 4/1969 | Anderson et al. | 210/59 |
| 4,780,512 | 10/1988 | Gould et al. | 525/454 |
| 5,147,646 | 9/1992 | Graham | 424/424 |
| 5,354,835 | 10/1994 | Blair | 528/76 |

OTHER PUBLICATIONS

Simpso; *Mastering Wordperfect 5.1 and 5.2 for Windows*; Sybex, Inc.; San Francisco; 1993; p. 157.

*Primary Examiner*—James J. Seidleck
*Assistant Examiner*—Rabon Sergent
*Attorney, Agent, or Firm*—William J. Spatz; Robert F. Kirchner

[57] ABSTRACT

Polyurethane polymers useful as hydrogels wherein the polyol is a specific polyol of block copolymers and a method for desalination of water.

11 Claims, No Drawings

DESALINATION PROCESS

This application is a divisional application of application Ser. No. 08/096,766 filed Jul. 23, 1993, now U.S. Pat. No. 5,354,835 granted Oct. 11, 1994.

SPECIFICATION

This invention relates to desalination of water, more particularly this invention relates to desalination of non-potable water to make it useful for human consumption, such as for potable use or agricultural use. Thus, the present invention concerns desalination of water by absorption of less saline or fresh water in a polymeric absorbent, followed by releasing the water by heating the absorbent. In accordance with this invention case, the water dissolves in and swells the polymer. At the higher temperature, the polymer shrinks and expels the water.

Still further, this process relates to a method for desalination of water by means of specifically tailored polymers. The novel method has outstanding advantages in that the novel use of the polyurethane polymers, consisting of specific block copolymers, i.e., polymer precursors provide, in the final polymer and the disclosed method, excellent water pick-up of up to several times the weight in water, salt expelling ability, outstandingly desirable $\Delta T°$ for the absorption-desorbtion operating conditions, hydration capacity of polymer and other and further advantages as these shall appear from the discussion herein.

BACKGROUND OF THE INVENTION

In arid continental regions of the world proximate to water sources such as salt water or on an island having deficient water supplies, e.g., Bermuda, a ready source of water would be sea water or brackish well water were it not for the high cost of obtaining salt-free water from these sources.

A great effort has been expended to develop various processes for this purpose, e.g., evaporation, amine solvent extraction, reverse osmosis, etc. In fact, in the United States the Office of Saline Water was established within the Department of Interior to investigate and find new methods for water recovery. In other countries where obtaining water is of national concern, similar governmental institutions exist.

Consequently as a result of these efforts and activity, a number of publications and patents have come into existence. The literature collection concerning water recovery is fairly large. This literature relates to various desalination methods and practices and illustrates schematically a number of processes.

However, for purposes of background understanding, the present invention relates to a method pertaining to the use of heretofore unknown family of hydrogels for absorbing water from sea water, brackish water or brackish well water and the like (collectively "saline water"), the removal of the hydrogels from the saline water and the expelling from the hydrogels of water of substantially reduced salinity and recovery methods associated therewith.

BRIEF DESCRIPTION OF THE INVENTION

The present invention and discovery has been made possible by the surprising and heretofore unknown behavior of a family of polyurethane polymers based on precursors such as obtained from specific block copolymers and prepolymers thereof which exhibit a behavior that makes these polymers especially attractive as hydrogels for removal of water. The improved quality of this family of hydrogels makes it especially attractive in that the difference in temperature between a regime of reasonable absorption or pick-up of water from the saline water and expulsion or desorption is very small, i.e., the rate of desorption over the temperature difference is great and the amount of absorbed and expelled or desorbed water within this range of temperature is large. Stated otherwise, water from the discovered family of hydrogels may be absorbed at low ambient temperature and expelled only on slight heating at slightly higher temperatures from the hydrogel despite the fact that a fairly large amount of water (relative to prior art hydrogels) is thus expelled.

Accordingly, when such slight temperature changes at a relatively low local ambient temperatures is used, the desalination cycle is achieved at relatively high efficiency (when measured against prior art) and the $\Delta T°$ is said to be very favorable. The inquiry is then concerning how efficient is the low temperature absorption-desorption cycle and such efficiency is typically measured by salt rejection, i.e., how salt free is the obtained water. The actual salt rejection herein approached levels as high as 70% on a first pass, which is a significant level in the use of hydrogels over the indicated temperature range and at a favorable rate, i.e., as a function of temperature v. amount of water v. time. However, higher salt rejection regimes may be obtained based on the described regime of polyols suitable for desalination.

Further, it has been found that the constituent amounts for the copolymers, in the hydrogel, could be related to properties such as absorption-desorption temperature, salt rejection and expelled water content. The water pick-up and absorption and/or desorption depends, therefore, on the proper selection of component parts of the block copolymer precursors and their proper incorporation in the prepolymer or the polyurethane polymer. Specifically the invention relates to precursor block copolymers of

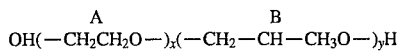

wherein in the block copolymer x denotes about 20%–30% by weight of A, and y denotes about 70%–60% by weight of B and the balance is TDI (toluene diisocyanate) and/or a cross-linking agent chain extender or other isocyanates such as MDI, i.e., 4,4-diphenyl methane diisocynate.

The distinction between the prior art and the herein disclosed invention resides in the "block" copolymer nature of a polyol made from A and B and prepolymers of these. For the intended purpose, copolymers of this type do not behave in the similar fashion to random copolymers. In fact, even among block copolymers the properties for the intended purpose are not predictable. Hence, the results are surprising, distinct and outstanding. Moreover, because the polyurethane polymers may be fashioned in suitable shapes, e.g., skeins, textiles, films, reinforced films, belts, such as conveyor type belts with adequate reinforcing etc., these shapes may be utilized to develop suitable recovery methods of the continuous type because the strength of the polymer allows festooning, e.g., a belt may be festooned in pick-up-absorption zone and/or desorption-expulsion zone.

RELEVANT PRIOR ART

There are several expired patent which related to the technology this invention addresses. Inventor Block of Universal Oil Products, (UOP), was granted U.S. Pat. Nos.

3,234,125 and 3,234,126 in 1966 for desalination by absorption/desorption using polyvinyl alcohol acetate and ethoxylated cellulose.

Jones and Anderson of Dow Chemical Company were granted U.S. Pat. No. 3,438,893 in 1969 on a similar process using cross linked polyurethane polymers. The United States Office of Saline Water evaluated that technology in the early 1979's, in a contract with Chemico Process Plants Company. Chemico Process Plants Company reported that the economics were not favorable in NITI's Report PB-236 934 and expressed a number of negative opinions.

The polymers in the Chemico Process Plants Company work had very poor physical properties, and the economics which were used for desalination by a return-of-investment analysis were unrealistic since these economics were based on unrealistic membrane economics.

Hass of Polaroid received U.S. Pat. No. 3,451,926 in 1967 for a similar concept using as the polymeric absorbent N-vinyl-2-ethyl imidazole, cross linked with a-a' dibromo-p-xylene. Segal and Schorr of American Metal Climax received U.S. Pat. No. 3,441,501 in 1969 on another solid absorbent process using phosphorus containing polyolefins. Lazare, of Puraq Company received U.S. Pat. No. 3,386,913 in 1968 on a similar process using a liquid-liquid extraction concept based on cellulose ethers. In 1973, Glavis and Clemens of Roban and Haas were granted U.S. Pat. No. 3,743,898 on a solid absorbent process using acrylate-acrylic acid copolymers.

None of these patents has disclosed the herein circumscribed class of polyol compounds and the polymers, and all have expired. Still further, none of the patents has related the variables which affect the viability of the process as discussed herein.

With respect to various polyols, a number of non applicable polyols are disclosed in the following patents.

U.S. Pat. No. 3,745,684 discloses block copolymers but does not relate any properties of these polyols to the desalination of water such as sea water or to polymers made from the polyols useful for that purpose.

U.S. Pat. No. 4,010,146 illustrates a blend of polyols of a copolymer of ethylene oxide and 12-propylene oxide and of poly(tetramethylene ether)glycol. The resulting polyol is reacted with a chain extended organic diisocyanate, e.g., MDI. The polymers are suitable for forming thermoplastic materials. A similar disclosure is, found in U.S. Pat. No. 4,124,572, granted November 7, 1978. This reference also discloses the preparation of block copolymers. U.S. Pat. No. 4,371,686 granted Feb. 1, 1983 teaches amines as chain extenders for a diisocyanate and a block copolymer as a polyol, but an opposite use of these polyols is suggested, i.e., reduced water absorbance.

Finally, U.S. Reissue Pat. No. 31,67 1 reissued on Sep. 11, 1984 teaches injection molded parts made from block copolymers used in conjunction with chain extenders. The polymers obtained from these polyols and chain extenders are thermoplastic and are primarily used as injection molded polymers.

DETAILED DESCRIPTION OF THE INVENTION AND EMBODIMENTS THEREOF

In accordance with the invention concerning block copolymers and the discovery concerning the use of the polymers made from the block copolymers, the present block copolymers exhibit a unique relationship - in distinction from the conventional copolymers and undifferentiated block copolymers which had been used for different purposes. Conventional copolymers are random copolymers or variations of the random copolymers with different terminal ends thereof.

Block copolymers are represented by blocks of A properly sequenced with blocks of B, e.g., a typical block copolymer may be represented by OH-AAA-B-AAA-H). A block polymer is defined as a copolymer in which each monomer is present in the form of chains made from the monomer of indeterminate length but which are deferred by the overall molecular weight or equivalent weight.

These block copolymers may be of various chain length, but chain length of predetermined uniform size is preferred and are generally identified by the molecular weight or equivalent weight. Typical median, desirable weight ratio of A to B, in the present invention, is about 30% of A to 60% of B, balance an isocyanate plus an optional chain extender such as water, ethylene glycol, MOCA (methylene (bis ortho chloro aniline), 1,4 butane diol, 1,6 hexane diol, trimethylol propane and the the like. The polyols are prepared by polyethoxylation of a starting hydrophobic polyol. The hydrophobic polyols are the blocks other than ethylene oxide listed are either propylene oxide, butylene oxide, or polytetramethylene ether, having a molecular weight of 1000 to 20000 daltons, an ethylene oxide content of 20% to 80%, and a functionality of two to eight. The chemistry of this process is given in the Encyclopedia of Polymer Science and Technology, Volume 2, p 508–509.

The useful range of the block copolymers is about from 15% to 35% ethylene oxide (EO) and about 75% to 55% propylene oxide (PO) by weight, balance for the polymer is toluene diisocyanate (TDI) or like isocyanate with or without an extender. However, the block copolymers where 30% is EO and 60% by weight are PO appear to be best suited from the discoveries made so far.

Besides the toluene diisocyanates suitable diisocyanates are methylene diphenyiisocyanate (MDI) aliphatic diisocyanates of 4 to 10 carbon atoms, e.g., such as a six carbon atom diisocyanate and derivatives and mixtures of the foregoing.

The above combination of polyurethane polymers and their properties are .surprising in their precursors behavior in distinction from the known prior art as disclosed in U.S. Pat. No. 3,438,893 (the "'893 patent") which disclose random copolymers of A and B and which used these polymers for the same purpose. The '893 patent does not show the advantages as discovered herein. This surprising distinction has been achieved despite the erroneously suggested applicability of the parameters, e.g., carbon-oxygen ratios, such as established by the prior art '893 patent. The surprising distinctions are based on the nature of the herein disclosed hydrogel polymer family defined by their precursor type and content and further characterized by the behavior of the polymer for the intended purpose.

In accordance with this invention the block copolymer precursors and the final hydrogel polymers having the above characteristics equilibrate rapidly and selectively with saline water at about room temperature and release purer water when heated to 30° C.–80° C. conditions particularly desirable for practical operation of a desalination process in arid regions where solar energy may furnish some of the power for desorption at the higher temperature. Furthermore, these polymers are easily prepared from readily available starting materials, i.e., block copolymers, isocyanates, prepolymers etc. as will be further described herein.

As used herein for demonstrating some of the advantages the terms "amount of water" absorbed, "liquid rejection" and "salt rejection" are defined as follows:

Amount of water absorbed wt. percent) $= \dfrac{W_S - W_D}{W_S} \times 100$

Liquid rejected (wt. percent) $= \dfrac{W_S - W_R}{W_S} \times 100$

Salt rejection (wt. percent) $= \dfrac{C_O - C_R}{C_O} \times 100$ where
$W_D$=Weight of dry, unswollen resin at temperature $T_1$;
$W_S$=Weight of water-swollen resin at temperature $T_1$;
$W_R$=Weight of recovered resin after desorption at $T_2$;
$C_O$=Initial salt concentration of solution; and
$C_R$=Salt concentration in recovered water.

These properties are readily determined by simple techniques. To reflect practical operating conditions, these properties are determined using a standard 3.5% NaCl (by weight) aqueous NaCl solution with initial absorption at room temperature of about 20° C.–25° C. and desorption at 35° C.–85° C. The physical polyurethane properties are determined in accordance with ASTM methods.

In contrast with the thermally reversible solvent extraction process wherein offensive amine solvents are particularly effective, oxygen-containing polymers are clearly preferred as selective, non-offensive, water absorbing, insoluble polymers. Although the detailed mechanism for the selective water absorption for these hydrophilic polymers is not known, reversible solvation involving hydrogen bonding, perhaps in a steric configuration, with the oxygen atoms is undoubtedly a factor.

The Polyols

In order to describe the metes and bounds of the invention, as based on the experiments, the following discussion of the polyol polymers should be helpful. A preferred polyol is a trifunctional polyol of about 1000 equivalent weight, and above, of polypropylene-oxide polyether resin (such as used for polyurethane foams), e.g., available from Union Carbide, Danbury, Connecticut, as for example as Niax LG-56 polyol, i.e., urethane based polyols capped with ethylene oxide. By changing the molecular weight, i.e., equivalent weight of the starting polyol or the percentage of the ethylene oxide in the block copolymer of this polyol, or by incorporating or adding a hydrophobic segment to the polyol, the following variables may be controlled: water pick-up, temperature at which water is absorbed and temperature at which water is desorbed, physical properties of the ultimate polyurethane polymer, and the abruptness of water release, i.e., desorption at a desirable temperature or $\Delta T°$ C. Based on the above, the desired polyol copolymer is a trifunctional block copolymer of approximately up to 40% ethylene oxide content by weight, an equivalent weight of about 1650 and an abrupt water release at approximately about 34° C. for the polyurethane polymer. The polyol should have good purity, i.e., low water content and a narrow, consistent distribution of polyol species in the polyol copolymer. By the hydrophobic segment in the polyol it is intended to mean a segment derived from propylene oxide, butylene oxide or polytetramethylene ether.

In addition to the copolymer, other polymer chain extenders are used such as listed above. These extenders should have a molecular weight below about 200.

In view of the above, the following regime will provide acceptable polyols within the purview of the invention: equivalent weight from 1000 up to 2000, desirably from about 1400 to about 1800, preferably about 1650±100, trifunctionality derived from the constituent block polymer components of ethylene oxide and propylene oxide and trimethylol propane and an abrupt pick-up $\leqq 34°$ C. and release at $\geqq 34°$ C. with the abruptness desirably over a range of about 50° C. as $\Delta T°$ C at about the 34° C. median point.

Moreover, for screening desirable copolymers the copolymer cloud point may be related to the water pick-up, i.e., absorption limit phenomenon, whereby a hydrogel swells and absorbs large quantities of water at a certain temperature at which the polyol becomes "cloudy" i.e., insoluble in the solvent, and upon heating desorbs a substantial, if not most of the water. Such absorption-desorption is initially related to the cloud point of water soluble high molecular weight polyol and like compounds; below its cloud point, the material is water soluble, and above it, the material is water insoluble. However, a cloud point determination is a necessary but not a sufficient condition to predict applicability.

A cross-linked polymer such as TDI cross-linked polyol cannot dissolve, but it does swell. If a swollen, cross-linked prepolymer changes from soluble to insoluble form, it will expel the solvent. This is what also happens when the water swollen hydrogel polymer is heated.

The functional group in the polyol which is associated with the cloud point phenomenon is the ether group. A cloud point in water solutions is seen in poly (methyl vinyl ether), and the entire family of ethylene oxide-propylene oxide block copolymer surfactants, as well as polyethylene oxide. The cloud point temperature depends on the ratio of carbon to oxygen. The higher the carbon to oxygen ratio, the lower is the cloud point temperature. Thus, polyethylene oxide, with an C:O ratio of 2:1, has a cloud point of 98° C., and poly (methyl vinyl ether), with an C:O ratio of 3:1, has a cloud point of 32° C. at 3% concentration or solution. Cloud points herein have been established for 50% solution of the polyols under investigation. Certain copolymers, with C:O ratios between those two extremes, have cloud points between these. There also seem to be steric considerations, since polypropylene oxide, which also has a C:O ratio of 3:1 has a cloud point around zero degrees centigrade.

Since the polymer swells and shrinks as it absorbs and desorbs water, it can generate a force, i.e., energy, which can be used to move the polymer or to pump water. Solar heating will produce a sufficiently elevated temperature to desorb water, therefore this additional energy if coupled to solar energy as a solar energy supplement can be used as solar energy driven water pump and desalinator.

The Prepolymer

The above polyol is typically reacted with, e.g., TDI or MDI as it is well known in the art. The amount of the readily available TDI may range in the prepolymer from about 8% to 15% by weight but may be as high as 30%. A convenient amount is 10% in a polyol of 30% EO and 60% PO, but within the regime as further circumscribed below, the diisocyanate may vary depending on the chain extenders used or the physical properties desired with higher, e.g., TDI amounts providing for additional coupling. In general, increasing the amount of isocyanate increases the strength and hardness of the polymer, but decreases the water pickup at any given temperature. A convenient amount added is a slight excess of two equivalents of TDI per equivalent of precursors thus yielding an isocyanate terminated precursor. The prepolymer is then caused to react, e.g., such as by casting into a film and allowed to, react with moisture, i.e., water as it is well known in the art.

Experimental Data

In order to establish an appropriate regime for the desired family of polyols within the above described parameters a number of polyols were investigated.

cal properties. These polymers had very low tensile strength, and broke up on repeated water absorption cycling. Polyurethane films prepared in this manner normally are strong rubbery materials and have a tensile strength greater than about 7500 psi. According to ASTM method D 412, most of the polymers prepared from Pluronic and Tetronic surfactants had tensile strengths below 1000 psi and were gummy rather than rubbery. A tensile strength of 3500 psi has been established as a threshold requirement, anything greater is a bonus.

TABLE 1

PROPERTIES OF PRECURSORS USED IN SYNTHESIS

| PRECURSOR | CLOUD POINT DEGREES °C. | | FUNCTIONAL GROUP/MOL | EQUIVALENT WEIGHT | % EO |
|---|---|---|---|---|---|
| | AT 1% | Concentration 10% | | | |
| *1. BLOCK COPOLYMERS SURFACTANTS* | | | | | |
| PLURONIC L-61 1) | 24 | 17 | 2 | 1000 | 10 |
| PLURONIC L-92 | 26 | 23 | 2 | 1825 | 20 |
| PLURONIC 25R-2 | 29 | 28 | 2 | 1550 | 20 |
| PLURONIC 31R-1 2) | 24 | 18 | 2 | 1625 | 10 |
| TETRONIC 90R4 | 43 | 24 | 4 | 1810 | 40 |
| TETRONIC 150R1 | 20 | 13 | 4 | 2000 | 10 |
| *POLYOLS FOR POLYURETHANE FORMS* | | | | | |
| VORANOL 232-023 3) | 19 | 13 | 3 | 2000 | 18 |
| VORANOL 232-034 | 21 | 15 | 3 | 1647 | 18 |
| VORANOL 235-056 | 30 | 19 | 3 | 1000 | 18 |
| NIAX-POLYOL 11-27 4) | 16 | 11 | 3 | 2074 | 18 |
| NIAX-POLYOL 11-34 | 18 | 13 | 3 | 1647 | 18 |
| DOW 15-200 3) | | 68 | 3 | 875 | |
| PPG 2025 ?) | | <0 | 2 | 1000 | 0 |
| *2. FUNCTIONAL FLUIDS (RANDOM COPOLYMERS)* | | | | | |
| UCON 50-H-1500 | 67 | 65 | 2 | 1400 | 50 |
| UCON 68-H-1400 | 99 | 86 | 2 | 1250 | 32 |
| UCON E648 | 18 | 13 | 2 | 1167 | 19 |

1) and 2) available from BASF corporation of Morristown, NJ.
3) available from Dow Chemical Corporation of Midland, Michigan.
4) available from Union Carbide, Danbury CT.

Prepolymer Synthesis

The prepolymers are synthesized by reacting one equivalent of, e.g., the Pluronic surfactant with 2.2 equivalents of toluene diisocyanate. No allowance was made for the presence of water in the surfactants. Some of the prepolymers had poor properties, such as gelling, and instability, attributable to, e.g., water content in the polyol. Thus, the poor properties of some of these prepolymers are explained by the presence of water, possible errors in molecular weight, and/or presence of impurities.

Returning to the polyols described above and specifically the surfactants as starting materials, the group of ethylene oxide-propylene oxide block copolymer surfactants were investigated. These are sold by the BASF Corporation such as under the names PLURONIC or TETRONIC. These surfactants were investigated to establish a proper comparison for the invention herein. These materials are hydroxyl terminated polyfunctional compounds which have known cloud points and a defined chemical compositions as shown above.

Polymers can be made from these materials. These polymers have absorption-desorption temperatures and water pickup content in the desirable range. However, most of the surfactant derived polymers did not possess adequate physi- Prepolymer formation was carried out by mixing appropriate amounts of the precursor and TDI at room temperature, and allowing the mixture to stand and react for a minimum of sixteen (16) hours. The equivalent weight of TDI is 89. The equivalent weights of the precursors were calculated from the molecular weights and functionality reported by the manufacturer. These equivalent weights were in the range of 1,000 to 2,000. The equivalent weights were also analyzed by the hydroxyl number method.

The weight ratio of TDI to surfactant was generally in the range of 5 to 15 parts of TDI to 100 parts of surfactant. The prepolymer is a viscous liquid which develops a skin on the surface when exposed to air. The material increases in viscosity and eventually gels over a period of several weeks. Unless the prepolymer batches had the undesirable constituents or undesirable characteristics, these were then evaluated.

Several prepolymers were unsuitable for casting due to premature gelling. Water consumes isocyanate, and thereby upsets the stoichiometry. If the molecular weight is improper, the stoichiometry is also improper, and the polymer will have poor physical properties or the prepolymer will have excessive viscosity. Several of these prepolymers gelled within a few hours because of water in samples.

The satisfactory prepolymers were cast with a Gardner knife as 1 mm thick films, and were allowed to polymerize by reaction with atmospheric moisture. Polymerization, which is also called curing, occurs from 24 to 72 hours, depending on the relative humidity. The desirable, cured films are to be strong, rubbery materials.

Water Pick-Up Experiments

The following describes the experiments for determining the water pick-up of synthesized polymers. In all cases, the water pick-up is expressed in grams of water per gram of polymer. The information presented in the following sections allows one to predict the amount of water transferred in any given temperature cycle.

All prepolymers were synthesized by reacting the precursors with TDI, as described above. The prepolymers were cast into films and allowed to cure. The polymer films, all weighing between 0.5 to 1.0 grams, were immersed in either fresh or salt water, and allowed to reach equilibrium at specific, reported temperature. The hydrated samples were then weighed to yield the water pick-up.

TABLE II

FRESH AND SALT WATER PICK-UP OF TDI POLYMERS AT 1 C (grams water per gram Polymer)

| PREPOLYMER POLYOLS | FRESH | SALT* |
|---|---|---|
| PLURONIC L92 | 11.74 | 1.57 |
| PLURONIC 25R2 | 1.38 | 1.1 |
| PLURONIC 25R4 | 6.63 | 5.69 |

TABLE III

FRESH AND SALT WATER PICK-UP OF TDI POLYMERS AT 5 C (grams water per gram polymer)

| PREPOLYMER POLYOLS | FRESH | SALT* |
|---|---|---|
| PLURONIC L92 | 1.11 | 0.58 |
| PLURONIC 25R2 | 0.85 | 1.21 |
| PLURONIC 25R4 | 6.33 | 5.25 |

TABLE IV

FRESH AND SALT WATER PICK-UP OF TDI POLYMERS AT 23.5 C (grams water per gram polymer)

| PREPOLYMER POLYOLS | FRESH | SALT* |
|---|---|---|
| PLURONIC 25R2 | 0.67 | 0.55 |
| PLURONIC 25R4 | 2.07 | 1.64 |

*NaCl solutions of 3.5 grams salt per 100 grams of water.

The low tensile strength of the polymers is due to the impurity of the Pluronic and Tetronic surfactants. Chemical analysis indicated that these surfactants contain varying amounts of water and other volatile materials as well as mono functional compounds. The above experiments show that not all block copolymers work and that a specific family of ethylene oxide-propylene oxide copolymers must be utilized of a high degree of purity and consistency.

Two other families of ethylene oxide-propylene oxide copolymers which are commercially available with purities suitable for preparation of polyurethane polymers were then investigated. One of the materials is ethylene oxide capped polypropylene oxide polyols which are used in manufacture of "HR" polyurethane foams and identified as Voranol 232–023, 232–034, and 232–056, and Niax Polyol 11–27 and 11–34. The other is known as Ucon functional fluids of the H series (identified above).

The capped polyols are block copolymers which are trifunctional and contain less than 20% ethylene oxide. The Ucon fluids are difunctional random copolymers, generally containing over 50% ethylene oxide.

Urethane polyols

The ethylene oxide capped polyurethane polyols which were investigated were DOW CHEMICAL COMPANY's VORANOL 232–034, VORANOL 232–023, VORANOL 235–056, and Voranol 15–200, and UNION CARBIDE CORPORATION's NIAX POLYOL 11–34 and NIAX POLYOL 11–27. The designation "urethane polyols" refers to their use rather than their composition.

The polyurethane polymers which were prepared in accordance with the above procedure were made with TDI from these precursors. These polyurethane polymers had very abrupt change of water absorbtion-desorbtion with respect to temperature. However, these polymers picked up and released water at an inconveniently low temperature and while useful in lower temperature arid regions of the world are not yet utilizable in the majority of arid regions of the world.

Most of the data herein were obtained with Voranol 232–034, which contains between 15% and 19% ethylene oxide. It has an equivalent weight of 1633, and its cloud point is 6° C. at 50% water.

TABLES V, VI and VII presents the water adsorption data for the identified urethane polyols at the above illustrated temperatures.

TABLE V

FRESH AND SALT WATER PICK-UP OF POLYMERS AT 1° C. (grams water per gram polymer)

| POLYMER BASED ON POLYOL PRECURSORS OF: | FRESH | SALT* |
|---|---|---|
| VORANOL 232-023 | 5.58 | 5.02 |
| VORANOL 232-034 | 3.6 | 1.67 |
| NIAX 11-27 | 5.61 | 3.99 |
| NIAX 11/34 | 3.6 | 2.24 |
| VORANOL 15-200 | 4.47 | 3.99 |

TABLE VI

FRESH AND SALT WATER PICK-UP OF POLYMERS AT 5° C. (grams water per gram polymer)

| POLYMER BASED ON POLYOL PRECURSORS OF: | FRESH | SALT* |
|---|---|---|
| VORANOL 232-023 | 5.45 | 4.29 |
| VORANOL 232-034 | 3.39 | 0.78 |
| NIAX 11-27 | 5.46 | 2.37 |
| NIAX 11/34 | 3.51 | 1.64 |
| VORANOL 15-200 | 4.75 | 3.81 |

TABLE VII

FRESH AND SALT WATER PICK-UP OF POLYMERS AT 23.5° C. (grams water per gram polymer)

| POLYMER BASED ON POLYOL PRECURSORS OF: | FRESH | SALT* |
|---|---|---|
| VORANOL 232-023 | 0.337 | 0.443 |
| VORANOL 232-034 | 0.4 | 0.397 |
| NIAX 11-27 | 0.28 | 0.276 |
| NIAX 11/34 | 0.312 | 0.427 |
| VORANOL 15-200 | 2.75 | 2.26 |

*NaCl at 3.5% per 100 grams of water.

At any given time temperature, the pick-up of salt water (3.5% NaCl) is less than the pick-up of fresh water.

The results of these experiments indicated that the prepared polymer will pick up and release 2.84 grams water per gram polymer in a cycle from 0° C. in salt water to 10° C. in fresh water. This is a very encouraging water pick-up ratio, but the salt rejection was not satisfactory. However, it illustrates again the unpredictability of the acceptable polyols because polymers with good water pick up and also good salt rejection are needed.

COMPARISON WITH RANDOM ETHYLENE OXIDE-PROPYLENE OXIDE COPOLYMERS (FUNCTIONAL FLUIDS)

Because of the inconvenience of working at refrigeration temperatures to obtain water recovery as indicated above, Union Carbide Corporation's Ucon polyol fluids were compared. These polyols have much higher cloud points. Ucon 68H is a random copolymer of 68% ethylene oxide and 32% propylene oxide, with an equivalent weight of 1250. The polyol has a cloud point of 93° C. at 50% concentration in water. A prepolymer of 15 g TDI to 100 g Ucon 68-H was prepared, which gave films of water pick up 4.34 g/g fresh water at 20° C.

As the temperature is raised, the polymer slowly loses water, only reaching 1.63 g/g at 65° C. This is different from the data obtained with the Voranol based polymer. The Voranol based polymers showed a very abrupt water content change at a temperature close to the cloud point. The Ucon 68-H polymers show a gradual change in water content at a temperature much below the cloud point. These two polymers have substantially similar TDI/polyol ratios. Again the data indicate the unpredictability of the water pick-up as coupled to the ΔT° concerning the desired water release.

Tables VIII, IX and X presents the water pick-up data for the identified functional fluids at the above discussed temperatures.

TABLE VIII

WATER PICK-UP OF POLYMERS AT 1° C. (grams water per gram polymer)

| POLYMER BASED ON POLYOL PRECURSORS OF: | FRESH | SALT* |
|---|---|---|
| UCON 50H-1500 | 12.25 | 11.09 |
| UCON 68H-1400 | 4.96 | 4.61 |

TABLE IX

WATER PICK-UP OF POLYMERS AT 1° C. (grams water per gram Polymer)

| POLYMER BASED ON POLYOL PRECURSORS OF: | FRESH | SALT* |
|---|---|---|
| UCON 50H-1500 | 9.63 | 9.46 |
| UCON 68H-1400 | 4.92 | 4.65 |

TABLE X

WATER PICK-UP OF POLYMERS AT 23.5° C. (grams water Per gram polymer)

| POLYMER BASED ON POLYOL PRECURSORS OF: | FRESH | SALT* |
|---|---|---|
| UCON 50H-1500 | 6.99 | 4.42 |
| UCON 68H-1400 | 3.67 | 3.16 |

There are several known differences between Voranol 232-034 and Ucon 68-H. First of all, the ethylene oxide contents are different. Voranol 232-034 has an ethylene oxide content of 15%-19%, while Ucon 68-H has an ethylene oxide content of 68%. Second, Voranol 232-034 is trifunctional while Ucon 68-H is difunctional. The trifuctionality of Voranol is from derived glycerol and polyol reaction.

As a result, the Voranol polymer is cross-linked by primary valence bonds, while the Ucon polymer is cross linked only by secondary valence bonds. Third, Voranol 232-934 is a block copolymer, while Ucon 68-H is a random copolymer. Both of these materials show a cloud point which appears to be proportional to the ethylene oxide content. However, molecular weight distribution may be different for each.

WATER PICK-UP SUMMARY

The water pick-up data presented are summarized in Table XI, below.

TABLE XI

WATER PICK-UP OF SELECTED POLYMERS vs. TEMPERATURE

| POLYMER BASED ON PREPOLYMER OF: | | 1° | 5° | 23.5° |
|---|---|---|---|---|
| PLURONIC L92 | FRESH | 1.74 | 1.11 | |
| | SALT | 1.54 | 0.58 | |
| PLURONIC 25R2 | FRESH | 1.38 | 0.85 | 0.67 |
| | SALT | 1.10 | 1.21 | 0.55 |
| PLURONIC 25R4 | FRESH | 6.63 | 6.33 | 2.07 |
| | SALT | 5.69 | 5.25 | 1.64 |
| VORANOL 232-023 | FRESH | 5.58 | 5.45 | 0.33 |
| | SALT | 5.02 | 4.29 | 7 |
| | | | | 0.44 |
| VORANOL 232-034 | FRESH | 3.6 | 3.39 | 0.40 |
| | SALT | 1.67 | 0.78 | 0.40 |
| DOW 15-200 | FRESH | 4.47 | 4.75 | 2.75 |
| | SALT | 3.99 | 3.81 | 2.26 |
| NIAX 11-27 | FRESH | 5.61 | 5.46 | 0.28 |
| | SALT | 3.99 | 2.37 | 0.27 |
| | | | | 6 |
| NIAX 11-34 | FRESH | 3.60 | 3.51 | 0.31 |
| | SALT | 2.24 | 1.64 | 0.43 |
| UCON 50H-1500 | FRESH | 12.25 | 9.63 | 6.99 |
| | SALT | 11.09 | 9.46 | 4.42 |

TABLE XI-continued

WATER PICK-UP OF SELECTED POLYMERS vs. TEMPERATURE

| POLYMER BASED ON PREPOLYMER OF: | | DEGREES° C. | | |
|---|---|---|---|---|
| | | 1° | 5° | 23.5° |
| UCON 68H-1400 | FRESH | 4.96 | 4.92 | 3.67 |
| | SALT | 4.61 | 4.65 | 3.16 |

SALT REJECTION

The salt rejection of these polymers was measured by determining the electrical conductivity of the water solution absorbed by the polymer and the conductivity of the water that is released when the polymer is heated.

In order to measure the salt rejection, a weighed sample of the polymer was allowed to absorb salt water a low temperature. The sample was reweighed to determine the amount of water pick-up. The sample is then placed in a measured amount of water which is heated to the release temperature, and allowed to come to equilibrium. The sample is then reweighed, which gives the amount of water released. The electrical conductivity of the water into which the sample was released is then measured. Given the electrical conductivity, salt concentration and thereby the weight of water recovered is determined. This allows one to calculate the salt absorbed with the water, and thereby the salt rejection. The electrical conductivity of salt water is essentially linear over the range of $10^{-2}$ to 10 percent, therefore this method is quite accurate.

Tables XII through XXIII show the water content versus temperature and salt rejections of various polymers. The first column in each one of the following tables represents the temperature of the measurement. The second column, represents the water pick-up of the hydrated sample in grams of water per gram of polymer. This column is divided into both Salt and Fresh Water. The third column, labeled SALT WEIGHT, ABSORBED, is the water pick-up in grams of water per gram of polymer of the sample hydrated in salt water (3.5% NaCl by weight). The fourth column, labeled SALT WEIGHT RECOVERED, is the theoretical weight of salt absorbed, calculated from the salt water pick-up and salt concentration. The fifth column, labeled SALT REJECTED is the weight of recovered salt, measured by the electrical conductivity of the recovered water, and the last column, labeled REJECTED SALT % is the percentage of salt rejection, calculated from theoretical amounts of salt absorbed versus salt recovered.

TABLE XII

SALT REJECTION
VORANOL 15-200 POLYMER, 1.57 g INITIAL WEIGHT

| TEMP °C. | Gr WATER PER Gr POLYMER | | SALT WT. ABSORBED | SALT WT. RECOVERED | SALT REJECTED |
|---|---|---|---|---|---|
| | FRESH | SALT | | | |
| 20° | 5.89 | 3.55 | 0.07 | | |
| 65° | 1.91 | 1.89 | | 0.1 | — |

TABLE XIII

SALT REJECTION
VORANOL 232-023 POLYMER, 0.86 g INITIAL WEIGHT

| TEMP °C. | Gr WATER PER Gr POLYMER | | SALT WT. ABSORBED | SALT WT. RECOVERED | SALT REJECTED |
|---|---|---|---|---|---|
| | FRESH | SALT | | | |
| 5° | 5.45 | 4.29 | 0.15 | | |
| 21° | 0.337 | 0.443 | | 0.077 | 49% |

TABLE XIV

SALT REJECTION
NIAX 11-34 POLYMER, 0.96 g INITIAL WEIGHT

| TEMP °C. | Gr WATER PER Gr POLYMER | | SALT WT. ABSORBED | SALT WT. RECOVERED | SALT REJECTED |
|---|---|---|---|---|---|
| | FRESH | SALT | | | |
| 1° | 3.6 | 2.24 | 0.0784 | | |
| 21° | 0.312 | 0.427 | | 0.054 | 31% |

TABLE XV

SALT REJECTION
NIAX 11-27 POLYMER, 0.70 g INITIAL WEIGHT

| TEMP °C. | Gr WATER PER Gr POLYMER | | SALT WT. | SALT WT. | SALT |
|---|---|---|---|---|---|
| | FRESH | SALT | ABSORBED | RECOVERED | REJECTED |
| 5° | 5.46 | 2.37 | 0.0829 | | |
| 21° | 0.28 | 0.276 | | 0.026 | 69% |

TABLE XVI

SALT REJECTION
VORANOL 232-034 POLYMER, 0.63 g INITIAL WEIGHT

| TEMP °C. | Gr WATER PER Gr POLYMER | | SALT WT. | SALT WT. | SALT |
|---|---|---|---|---|---|
| | FRESH | SALT | ABSORBED | RECOVERED | REJECTED |
| 1° | 3.6 | 2.24 | 0.0784 | | |
| 21° | 0.4 | 0.397 | | 0.025 | 68% |

TABLE XVII

SALT REJECTION
UCON 68H-1400/PPG2025 POLYMER, 2.0 g INITIAL WEIGHT

| TEMP °C. | Gr WATER PER Gr POLYMER | | SALT WT. | SALT WT. | SALT |
|---|---|---|---|---|---|
| | FRESH | SALT | ABSORBED | RECOVERED | REJECTED |
| 20° | | 4.52 | 0.09 | | |
| 65° | | 2.57 | | 0.07 | 22% |

TABLE XVIII

SALT REJECTION
VORANOL 15-200B POLYMER, 1.44 g INITIAL WEIGHT

| TEMP °C. | Gr WATER PER Gr POLYMER | | SALT WT. | SALT WT. | SALT |
|---|---|---|---|---|---|
| | FRESH | SALT | ABSORBED | RECOVERED | REJECTED |
| 20° | 4.23 | 3.96 | 0.09 | | |
| 65° | 1.68 | 1.71 | | 0.06 | 33% |

TABLE XIX

SALT REJECTION
VORANOL 15-200 POLYMER, 1.59 g INITIAL WEIGHT

| TEMP °C. | Gr WATER PER Gr POLYMER | | SALT WT. | SALT WT. | SALT |
|---|---|---|---|---|---|
| | FRESH | SALT | ABSORBED | RECOVERED | REJECTED |
| 20° | 4.18 | 4.1 | 0.09 | | |
| 65° | 1.99 | 1.99 | | 0.06 | 33% |

TABLE XX

SALT REJECTION
UCON 68-H-1400 POLYMER, 0.89 g INITIAL WEIGHT

| TEMP °C. | Gr WATER PER Gr POLYMER | | SALT WT. ABSORBED | SALT WT. RECOVERED | SALT REJECTED |
|---|---|---|---|---|---|
| | FRESH | SALT | | | |
| 0° | 4.96 | 4.61 | 0.1613 | | |
| 21° | 3.67 | 3.16 | | 0.114 | 29% |

TABLE XXI

SALT REJECTION
UCON 68-H-1400 POLYMER, 0.89 g INITIAL WEIGHT

| TEMP °C. | Gr WATER PER Gr POLYMER | | SALT WT. ABSORBED | SALT WT. RECOVERED | SALT REJECTED |
|---|---|---|---|---|---|
| | FRESH | SALT | | | |
| 0° | 4.96 | 4.61 | 0.1613 | | |
| 65° | 0.97 | 0.89 | | 0.129 | 20% |

TABLE XXII

SALT REJECTION
UCON 50-H-1500 POLYMER, 1.10 g INITIAL WEIGHT

| TEMP °C. | Gr WATER PER Gr POLYMER | | SALT WT. ABSORBED | SALT WT. RECOVERED | SALT REJECTED |
|---|---|---|---|---|---|
| | FRESH | SALT | | | |
| 0° | 12.25 | 11.09 | 0.5631 | | |
| 21° | 6.99 | 4.42 | | 0.24 | 57% |

TABLE XXIII

SALT REJECTION
UCON 50-H-1500 POLYMER, 1.10 g INITIAL WEIGHT

| TEMP °C. | Gr WATER PER Gr POLYMER | | SALT WT. ABSORBED | SALT WT. RECOVERED | SALT REJECTED |
|---|---|---|---|---|---|
| | FRESH | SALT | | | |
| 0° | 12.25 | 11.09 | 0.5631 | | |
| 65° | 1.86 | 2.01 | | 0.288 | 49% |

The salt rejection was measured by the following method. A weighed sample of polymer which had been equilibrated in water was placed in a 3.5% saline solution at a low temperature and allowed to reach a new-equilibrium. The sample was weighed and a water pick-up was calculated from the total weight and the dry weight. The theoretical salt pick-up was calculated from the weight of water picked up and the salt concentration.

The sample was then placed in distilled water and heated to the water release temperature and allowed to equilibrate. The polymer sample was then removed from the water and weighed, making possible the calculation of water released. The salt concentration of the water in which the sample was heated was measured by electrical conductivity, and the weight of salt recovered was calculated from the amount of water and the concentration.

Using this method, the salt rejection was calculated for the various polymers, and it was found that there was little pattern in the salt rejection further establishing the unpredictability.

The polymers made from the UCON fluids gained and lost water gradually over a wide temperature range, so the initial water pick-up can be controlled easily by adjusting the temperature at which the water is absorbed. By using this method, it is possible to show the relationship between water pick-up and salt rejection, and to achieve salt rejections of up to 70%.

The water pick-up of the polyurethane polymers was then tailored by including hydrophobic blocks in the polymers. This was done by mixing a prepolymer made from a hydrophobic or water insoluble polyurethane polyol such as the reaction product of three moles of TDI with one mole of Niax polyol LG-56 with the prepolymer made form a hydrophilic precursor such as a nonionic surfactant or EO capped urethane polyol. The examples of the hydrophobic or water insoluble polyurethane polyols used in these experiments are polypropylene glycol having a molecular weight of 2000 and Niax polyol LG-56, manufactured by Union Carbide. The slope of the curve of water pick-up versus temperature is controlled by the nature of the precursor, while the water pickup at any given temperature is controlled by the ratio of the amounts of hydrophilic and hydrophobic segments.

The above identified investigation illustrates the unpredictability of polymers useful for the obtention of water from saline solutions. However, from the established data illustrating the non-workable, polyurethane polymers disclosed herein, a regime has been established for the polymers within which the methods may be practiced. Thus, the present invention provides for the polymers which are useful in the method as described below.

Typically the obtained polymers may be cast in shapes and if needed with a reinforcing matrix of suitable supporting material, e.g., high strength fiber material, e.g., of glass, polyester, polyaramid, polyalkylene, e.g., Spectra type polymers (available from Allied Chemical Corp. of Morristown, NJ) etc. Appropriately, belts may be fashioned and then festooned in suitable water-pick-up zones and water desorbtion zones which are maintained under conditions established as suitable for these zones.

The recovered water may be recovered in a plurality of zones in which water is of increasing purity. The rejected water from the additional zones is returned counter currently to the preceding zone (except the first zone) and progressively exhausted until the salt content in the water approaches salt content in the first zone. In this manner the progressive exhaustion of the recovered water is possible. Further, the obtained water, depending on the recovery stages finds greater and greater fields of utilization.

Appropriate patents which illustrate the above describe variations in the method in still greater detail are U.S. Pat. Nos. 4,747,951 and 3,386,913. These patents show a single stage and multistage processes. These patents are incorporated by reference herein.

The described invention is defined by the claims herein in which the reasonable variations are considered within the scope of the claims.

What is claimed is:

1. In a method for recovering water having a lower salt content in a form of a less saline water, from a starting saline water solution the improvement comprising:

immersing a hydrogel polymer shape in a saline water solution at about room temperature for a time sufficient to absorb said less saline water within said polymer, said polymer being comprised of a polyol and a polyisocyanate, said polyol is comprised of a block copolymer of A and B, wherein in said block copolymer constituent A is from about 15 to 35% by weight and B is from about 55% to 75% by weight, and wherein said polyol of A and B has an equivalent weight from about 1000 to 2000, the polyol is polyfunctional with hydroxyl functionality of two to eight and the polyisocyanate has two isocyanate groups and the hydrogel polymer in a cured condition has a tensile strength of at least 3500 psi and wherein A in said block copolymer is of poly-ethylene oxide and B is of a poly-propylene oxide, poly-butylene oxide or poly tetra methylene ether;

removing said hydrogel polymer shape from said starting saline water; and recovering by heating, said less saline water by heating said hydrogel polymer to from 30° C. to 80° C.

2. The method as defined in claim 1 wherein the polyol of A and B comprises an ethylene oxide capped polypropylene oxide polyol.

3. The method as defined in claim 1 wherein the block copolymer of A and B has an equivalent weight of about 1650 and the polyol is a trifunctional polyol which has a hydroxyl functionality of three.

4. The method as defined in claim 1 wherein the polyol is formed into an isocyanate terminated prepolymer by reaction with a polyisocyanate, and said prepolymer is cured to form a hydrogel polymer shape.

5. The method as defined in claim 4 wherein said polyol is chain extended by a chain extender of a molecular weight below about 200.

6. The method as defined in claim 1 wherein in said block copolymer A is of a poly-ethylene oxide and B is of a polypropylene oxide.

7. The method as defined in claim 1 wherein said hydrogel polymer shape is a continuous belt.

8. The method as defined in claim 1 wherein said saline solution is sea water and said hydrogel polymer is formed from an isocyanate terminated prepolymer.

9. The method as defined in claim 1 wherein the polyol comprises a block copolymer of poly-ethylene oxide as A and poly-propylene oxide as B and in said copolymer A is about 30% by weight and B is about 60% by weight.

10. The method as defined in claim 9 wherein said polyol comprises blocks of hydrophobic components.

11. The method as defined in claim 1 wherein room temperature is about 20° C. to 25° C.

* * * * *